US010265899B2

(12) United States Patent
Kulp et al.

(10) Patent No.: US 10,265,899 B2
(45) Date of Patent: Apr. 23, 2019

(54) PELLET AND PRECURSOR WITH RECYCLED CONTENT

(71) Applicant: PLASTIPAK PACKAGING, INC., Plymouth, MI (US)

(72) Inventors: James Kulp, Dexter, MI (US); Thomas Busard, Novi, MI (US); Craig Robel, Holt, MI (US); Timothy Susalla, Howell, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 227 days.

(21) Appl. No.: 14/693,491

(22) Filed: Apr. 22, 2015

(65) Prior Publication Data

US 2015/0299459 A1    Oct. 22, 2015

Related U.S. Application Data

(60) Provisional application No. 61/982,508, filed on Apr. 22, 2014.

(51) Int. Cl.
*B29C 47/00* (2006.01)
*C08L 67/02* (2006.01)
*C08J 11/06* (2006.01)
*B29B 9/06* (2006.01)
*B29K 67/00* (2006.01)
(Continued)

(52) U.S. Cl.
CPC .......... *B29C 47/0066* (2013.01); *B29B 9/06* (2013.01); *B29C 47/0011* (2013.01); *C08J 11/06* (2013.01); *B29B 9/065* (2013.01); *B29B 2009/125* (2013.01); *B29K 2067/00* (2013.01); *B29K 2105/26* (2013.01)

(58) Field of Classification Search
CPC ... B29C 47/0066; B29C 47/0011; B29B 9/06; B29B 9/065; B29B 2009/125; C08J 11/06; B29K 2067/00; B29K 2105/26
USPC .................................................. 264/141, 142
See application file for complete search history.

(56) References Cited

U.S. PATENT DOCUMENTS 3,674,736 A * 7/1972 Lerman ...................... C08J 3/12
264/117
3,872,200 A * 3/1975 Tokito ................... B29C 44/461
264/117
(Continued)

FOREIGN PATENT DOCUMENTS

DE    102008063232 A1    7/2010
EP        0442102 A1    8/1991
WO       2006020603 A2    2/2006

OTHER PUBLICATIONS

Bill Bregar, Rotomolding giant Toter enters custom molding, Plastics News, Sep. 2, 2011, Crain Communications, Inc. <http://www.plasticsnews.com/article/20110902/NEWS/309029991&template=printthis>.

(Continued)

*Primary Examiner* — Nahida Sultana
(74) *Attorney, Agent, or Firm* — Fishman Stewart PLLC

(57) ABSTRACT

A precursor for use in forming a multi-attribute pellet that includes virgin and recycled content is disclosed. The precursor may comprise a micro-pellet including recycled content. In embodiments, the micro-pellet may be in the range of about 300 pieces per gram to about 1200 pieces per gram. Embodiments of methods for forming precursors and methods for forming multi-attribute pellets are also disclosed.

10 Claims, 1 Drawing Sheet

10

(51) Int. Cl.
*B29K 105/26* (2006.01)
*B29B 9/12* (2006.01)

(56) References Cited

U.S. PATENT DOCUMENTS

| | | | | |
|---|---|---|---|---|
| 3,920,783 | A | * | 11/1975 | Hara ................ B01J 2/20 225/103 |
| 4,822,545 | A | * | 4/1989 | Kresge ............ B29C 47/8895 264/141 |
| 5,194,461 | A | * | 3/1993 | Bergquist .............. C08J 5/045 521/47 |
| 5,380,793 | A | * | 1/1995 | Pepper ................ C08G 63/553 521/40 |
| 5,486,327 | A | * | 1/1996 | Bemis ................ B01F 5/0473 264/211.21 |
| 6,149,847 | A | | 11/2000 | Geier et al. |
| 6,306,318 | B1 | * | 10/2001 | Ricciardelli ........ B29C 45/0005 264/160 |
| 6,342,091 | B1 | | 1/2002 | Menzel et al. |
| 7,259,227 | B2 | | 8/2007 | Schulz Van Endert et al. |
| 7,608,225 | B2 | | 10/2009 | Schulz Van Endert et al. |
| 7,674,878 | B2 | | 3/2010 | Hanimann et al. |
| 7,866,486 | B2 | | 1/2011 | Werth et al. |
| 7,993,557 | B2 | | 8/2011 | Hanimann et al. |
| 8,207,289 | B2 | | 6/2012 | Jernigan |
| 8,362,189 | B2 | | 1/2013 | Schoennagel |
| 8,399,602 | B2 | | 3/2013 | Hagen et al. |
| 8,470,220 | B2 | | 6/2013 | Hanimann et al. |
| 8,556,610 | B2 | | 10/2013 | Hanimann et al. |
| 8,591,846 | B2 | | 11/2013 | Menzel |
| 8,597,553 | B1 | * | 12/2013 | Clark ................ B29D 99/0078 264/101 |
| 9,951,171 | B2 | * | 4/2018 | Tabor ................ C09D 167/02 |
| 9,976,018 | B2 | * | 5/2018 | Stanhope ............ B32B 27/32 |
| 2006/0060997 | A1 | * | 3/2006 | Nagai ................ C08B 3/16 264/1.31 |
| 2008/0236443 | A1 | * | 10/2008 | Salsman ............ C08G 18/4252 106/31.13 |
| 2010/0152311 | A1 | * | 6/2010 | Booth ................ C08J 11/04 521/48 |
| 2010/0311920 | A1 | * | 12/2010 | Gonzalez Montiel ................ C08F 222/00 525/92 E |
| 2011/0263758 | A1 | * | 10/2011 | Wu ................ C08J 5/045 524/14 |
| 2012/0077890 | A1 | * | 3/2012 | Mancosh ................ C04B 16/06 521/68 |
| 2012/0190800 | A1 | * | 7/2012 | Felice ................ C08G 63/183 525/419 |
| 2012/0220735 | A1 | | 8/2012 | Jernigan |
| 2014/0061967 | A1 | * | 3/2014 | Stanhope ............ B29B 17/0042 264/173.19 |
| 2016/0053058 | A1 | * | 2/2016 | Tabor ................ C09D 167/02 521/161 |
| 2016/0244598 | A1 | * | 8/2016 | Stanhope ............ B32B 27/32 |
| 2017/0152611 | A1 | * | 6/2017 | Clark ................ D01D 5/08 |
| 2017/0203487 | A1 | * | 7/2017 | Clark ................ B29C 47/42 |
| 2017/0275785 | A1 | * | 9/2017 | Williams ................ D01F 6/92 |

OTHER PUBLICATIONS

Micropellet technology comes of age, Plastics Additives and Compounding, Elsevier Science, Oxford, GB, vol. 9, No. 4. Sep. 1, 2007, pp. 44-45, ISSN: XP022279377.

UHDE Inventa-Fischer. "Flakes-To-Resin FTR®—PET Recycling." Web. Jan. 1, 2014. <www.uhde-inventa-fischer.com/polyesters/flakes-to-resin-ftrc2ae>.

UHDE Inventa-Fischer. "Melt-To-Resin MTR®." Web. Jan. 1, 2014. <www.uhde-inventa-fischer.com/polyesters/melt-to-resin-mtrc2ae>.

* cited by examiner

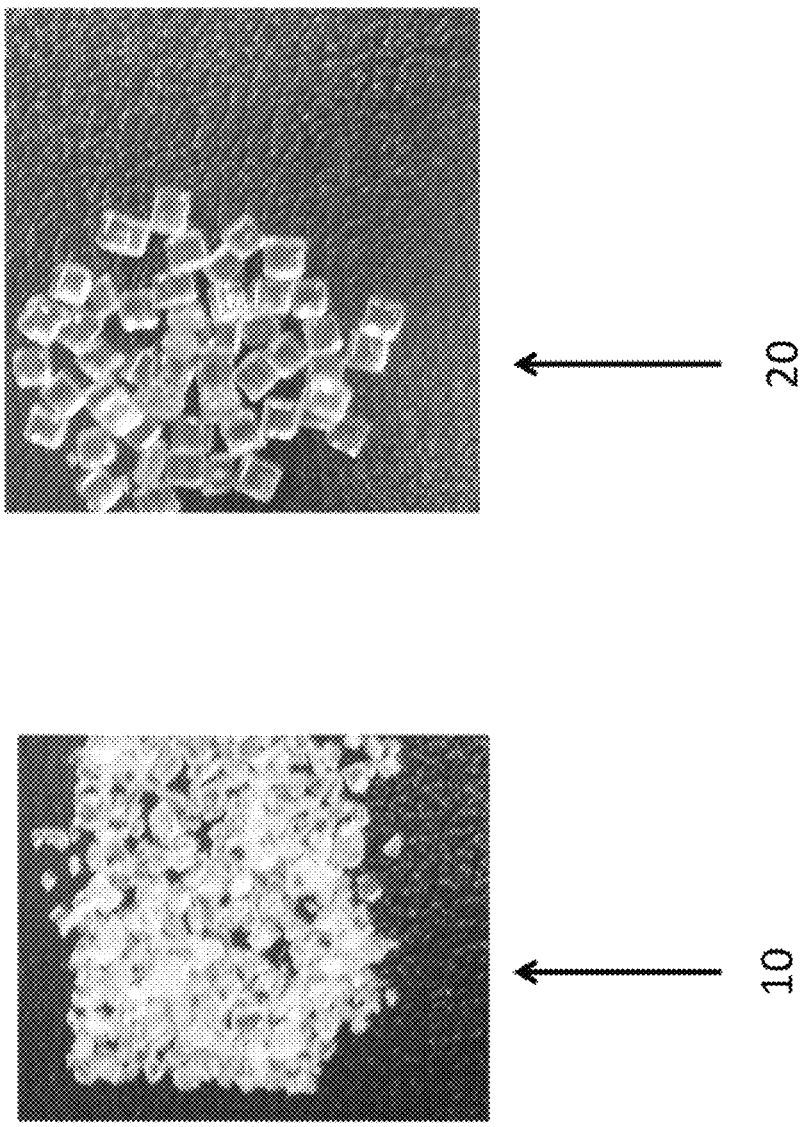

PELLET AND PRECURSOR WITH RECYCLED CONTENT

CROSS-REFERENCE TO RELATED APPLICATION

This application claims priority from U.S. Provisional Application No. 61/982,508, filed Apr. 22, 2014, which is hereby incorporated by reference as though fully set forth herein.

TECHNICAL FIELD

The present invention relates to pellets, such as single or individual pellets, having a virgin and a recycled content, and systems and manufacturing methods associated with such pellets.

BACKGROUND

Polymer or plastic resins, such as polyethylene terephthalate (PET), which may be comprised of petrochemical-derived raw materials or petroleum-based PET, are commonly used to manufacture a number of commercial articles. It is often desirable to produce resins, such as PET resins, with post-consumer recycled (PCR) content. Extrusion is one of the processes that may be used in connection with the manufacture of various articles.

Among other things, it can be desirable to provide pellets that can be formed, in part, from micro-pellets, such that the formed pellets include both virgin and recycled content.

SUMMARY

Among other things, embodiments of a precursor is disclosed. The precursor may be used to form embodiments of a multi-attribute pellet that includes both virgin and recycled content. The precursor may comprise a micro-pellet with recycled content. In embodiments, the micro-pellet may be in the range of about 300 pieces per gram to about 1200 pieces per gram.

BRIEF DESCRIPTION OF THE DRAWINGS

Embodiments of the disclosure will now be described, by way of example, with reference to the accompanying drawings, wherein:

FIG. 1 is an illustration of micro-pellet precursors; and

FIG. 2 is an illustration of conventional pellets with recycled content taken, for comparison, from essentially the same perspective and vantage point as the photograph of FIG. 1.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by appended claims.

Among other things, the inventive concept involves a multiple-attribute pellet, which may be referred to as a "single pellet." With embodiments, the multi-attribute (or single pellet) may be comprised of both virgin content and recycled content.

A precursor—which may be comprised of recycled material or content—may be used to make or produce a multi-attribute or single pellet. A precursor may be added in or with what otherwise may be a conventional or standard process for producing virgin resin. With embodiments, a precursor may be in the form of a flake or pellet. For embodiments, a precursor can be sufficiently small (in size or volume) to suspend and dissolve in a solution (e.g., a pre-melt phase solution) that may be part of early resin manufacturing stages. For example, and without limitation, precursor formats may be in micro-pellet format (e.g., strand cut) or particle format (e.g., milled). By way of example, and without limitation, a disclosure of certain PET articles and manufacturing processes are disclosed in U.S. Pat. No. 8,207,289, which is incorporated by reference herein in its entirety.

While conventional PCR resins may be commonly comprised of flake, for some applications flake may not be the more reliable option with respect to suspension and dissolution. Consequently, for a number of applications, pellets (which may be in the form of micro-pellets) may be a preferable option.

Very small or tiny PCR pellets (which may also be referred to as "micro-pellets") may be used as a precursor for making a multi-attribute pellet.

An embodiment of micro-pellets are generally illustrated in FIG. 1. The relative size of the illustrated micro-pellets, which may be over 800 pieces (or particles) per gram, can be visually contrasted with conventional pellets having recycled content, which are generally illustrated in FIG. 2, and may be about 50 pieces (or particles) per gram. It is noted that some recycled content can come from post-consumer recycled (PCR) or post-industrial recycled (PIR) sources. For the purposes of this disclosure, "PCR" will be used to generally refer to recycled plastics, regardless of the source. Some micro-pellets may be in the range of about 300 pieces (or particles) per gram to about 1200 pieces (or particles) per gram, other micro-pellets may range from about 550 pieces (or particles) to about 1000 pieces (or particles) per gram (i.e., ppg), with more particles per gram commonly preferred for a number of embodiments and applications. For example, and without limitation, embodiments of micro-pellets may have an average weight from about 0.001 grams to about 0.0018 grams.

To create the multi-attribute pellets (such as those including both virgin and PCR content), a PCR precursor—which may comprise micro-pellets comprised of recycled material or content—may be run through an extruder. An extruder may, for example and without limitation, comprise a twin screw and may include a vacuum to help remove volatiles. For some embodiments, the extruded material may be extruded without drying and may produce an amorphous pellet.

With embodiments, a precursor may be cut (or otherwise severed or separated) to form pellets. Cutting may be accomplished, for example, using a strand cut or underwater cut. Further, the pellet may be formed flatter or more round, as may be preferred for suspension. In embodiments, cut or severed precursor pellets may be subsequently introduced in or run through an extruder along with virgin-content material to form a multi-attribute pellet.

Further, with embodiments, the precursor process may include a modified version of a PET process involving strand cutting of PCR pellets (e.g., pellets of 50 pieces per gram size) and additional techniques. In an embodiment, clean PCR flake can be extruded—e.g., undried (as opposed to a typical process which may require drying), and then the extruded/melt-filtered amorphous pellet (e.g., at 50 pieces per gram) can be milled to a much smaller size (e.g., about 300 pieces per gram to about 1200 pieces per gram) to form a micro-pellet. The micro-pellet may then be added to or introduced into a virgin manufacturing process essentially as a raw material. Notably, the properties of the precursor can be particularly conducive for such addition or introduction into a manufacturing process. The properties of a precursor taught in connection with teachings of the present disclosure may be contrasted with conventional PCR. Among other things, conventional PCR will commonly sink in a PTA/MEG slurry tank, so conventionally parties do not add standard PCR or flake.

In an embodiment, without limitation, a micro-pellet may be configured for suspension—such as in a pre-melt phase solution tank. With some embodiments, a precursor may be added to a virgin-content manufacturing process without any further processing. With some embodiments, a precursor may be added to a virgin-content manufacturing process as a direct feedstock replacement. That is, for some applications, a precursor may serve as a direct feedstock replacement.

Micro-pellets may, for example, range from 300 to 1200 pieces/particles per gram, although other/smaller sizes may be contemplated. In some embodiments, the micro-pellet may, for example and without limitation, weigh less than 1.9 milligrams, have a density of about 1.33 g/cc, and/or may have an intrinsic viscosity (IV) range of 0.50 dL/g to 0.60 dL/g. With some embodiments, a micro-pellet may, for example and without limitation, have a radius of 0.05 cm, a volume of 0.0016 cc, and/or an area of 0.08 $cm^2$ or 32.2 $cm^2/g$ (in which an initial flake was 63.4 $cm^2/g$).

In an embodiment, the micro-pellet may range from 300-1200 pieces/particles per gram, may have an intrinsic viscosity (IV) ranging from about 0.50 dL/g to about 0.70 dL/g, and/or may have a bulk density ranging from 35 pounds/$ft^3$ to 45 pounds/$ft^3$. It is noted that for some embodiments or applications, a more practical micro-pellet range may be in the range of about 700 pieces/particles per gram to about 1200 pieces/particles per gram. Additionally, for some embodiments:
(a) the contaminant limits may be:
  PVC<50 ppm
  Aluminum<25 ppm
  Other colored flake<100 ppm
(b) the acetaldehyde (AA) limit may be <2 ppm;
(c) the moisture limit may be <0.5% by weight; and/or
(d) there may be a defined color range for amorphous pellets.

With respect to a color range associated with an amorphous pellet, the color may, for example, be measured in a step prior to milling into a final form of a precursor. Various color scales may be employed, including without limitation, the Hunter LAB color scale and the CIE LAB color scale. Those particular color tests are both based on the Opponent-Color Theory, which assumes that the receptors in the human eye perceive color as the following pairs of opposites:
  L scale—lightness versus darkness, where a low number (0-50) indicates dark, and a high number (51-100) indicates light;
  a scale—redness versus greenness, where a positive number indicates red, and a negative number indicates green; and
  b scale—yellowness versus blueness, where a positive number is indicative of yellow, and a negative number is indicative of blue.

All three values (L, a, and b) are typically necessary to completely describe the color of an object. A distinction between the Hunter and CIELAB color coordinates is that CIE coordinates are based on a cube root transformation of the color data, and the Hunter coordinates are based on a square root transformation.

In an embodiment, and employing the CIE L*a*b* color scale, a micro-pellet may, for example and without limitation, have the following color values/attributes (when measured at the step prior to final milling into particles): L*>43 and b*<8.

However, it is noted that for embodiments, several parameters other than perhaps particles per gram may not be particularly limiting. That is, for some embodiments and applications, certain parameters disclosed herein with exemplary embodiments, including color scale and IV values, may not be critical, and the disclosed concept need not be limited to various numbers and ranges, including the exemplary numbers and ranges mentioned and described herein.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A method of making a multi-attribute pellet comprising virgin and recycled polyethylene or polyethylene terephthalate content, the method comprising:
  (a) providing a precursor in the form of a pellet or micro-pellet, the precursor comprising recycled polyethylene or polyethylene terephthalate, and the precursor being in a range of about 300 pieces per gram to about 1200 pieces per gram;
  (b) suspending or dissolving the precursor in a pre-melt phase solution;
  (c) including the precursor of step (b) with an extrusion of a virgin polyethylene or polyethylene terephthalate resin; and
  (d) extruding a multi-attribute pellet.

2. The method of claim 1, wherein the precursor is strand cut or milled.

3. The method of claim 1, wherein the precursor is run through an extruder, and provides an extruded material.

4. The method of claim 3, wherein the extruded material is extruded without drying and provides an amorphous pellet.

5. The method of claim 1, wherein the precursor is cut or severed to a plurality of pellets.

6. The method of claim 5, wherein the plurality of pellets are formed to have a flat shape.

7. The method of claim 5, wherein the plurality of pellets are formed to have a round shape.

8. The method of claim 5, wherein the precursor is added to a virgin-content manufacturing process as a direct feedstock replacement.

9. The method of claim 1, wherein the extruding is performed without drying.

10. The method of claim 1, wherein the precursor of step (a) is cut or severed to a plurality of pellets having a flat or round shape.

* * * * *